United States Patent
Akiya (10) Patent No.: US 8,215,696 B2
(45) Date of Patent: Jul. 10, 2012

(54) VEHICLE SUN VISOR

(75) Inventor: Hideki Akiya, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 396 days.

(21) Appl. No.: 12/369,089

(22) Filed: Feb. 11, 2009

(65) Prior Publication Data

US 2009/0278374 A1 Nov. 12, 2009

(30) Foreign Application Priority Data

May 8, 2008 (JP) .................................. 2008-122734

(51) Int. Cl.
*B60J 3/00* (2006.01)
(52) U.S. Cl. ................ 296/97.8; 296/97.11; 160/370.21
(58) Field of Classification Search ................ 296/97.1, 296/97.6, 97.8, 97.11, 97.12, 97.13; 160/370.21, 160/370.22
See application file for complete search history.

(56) References Cited

U.S. PATENT DOCUMENTS

| | | | | | |
|---|---|---|---|---|---|
| 4,090,732 | A | * | 5/1978 | Vistitsky ........................ | 296/97.8 |
| 4,623,188 | A | * | 11/1986 | Juraschek et al. ........... | 296/97.5 |
| 4,950,021 | A | * | 8/1990 | Vandagriff .................... | 296/97.6 |
| 4,971,383 | A | * | 11/1990 | Tawaraya ...................... | 296/97.1 |
| 5,015,027 | A | * | 5/1991 | Rifaat ............................ | 296/97.6 |
| 5,031,952 | A | | 7/1991 | Miyamoto et al. | |
| 5,283,683 | A | * | 2/1994 | Yamamoto .................... | 359/229 |
| 5,316,361 | A | | 5/1994 | Miller | |
| 5,374,097 | A | * | 12/1994 | George et al. ................ | 296/97.5 |
| 5,445,427 | A | * | 8/1995 | Vandagriff .................... | 296/97.6 |
| 5,472,255 | A | * | 12/1995 | Moore .......................... | 296/97.6 |
| 5,484,183 | A | * | 1/1996 | Rosa ............................. | 296/97.6 |
| 5,580,117 | A | * | 12/1996 | Goclowski ................... | 296/97.6 |
| 5,662,370 | A | * | 9/1997 | Kassner ........................ | 296/97.6 |
| 6,189,947 | B1 | * | 2/2001 | Annan ......................... | 296/97.12 |
| 6,899,371 | B1 | * | 5/2005 | Hammond .................... | 296/97.6 |
| 7,344,176 | B2 | * | 3/2008 | Maharaj ........................ | 296/97.6 |
| 2004/0032143 | A1 | * | 2/2004 | Amirmoini .................... | 296/97.6 |
| 2007/0080556 | A1 | | 4/2007 | Milano | |

FOREIGN PATENT DOCUMENTS

| | | |
|---|---|---|
| JP | 7-266877 A | 10/1995 |
| JP | 8-053025 A | 2/1996 |
| JP | 2002-002278 A | 1/2002 |
| JP | 2002-178750 A | 6/2002 |
| JP | 2003-165332 A | 6/2003 |
| JP | 2004-142582 A | 5/2004 |

(Continued)

OTHER PUBLICATIONS

English language Abstract and translation of JP 2003-165332 A.

(Continued)

*Primary Examiner* — Glenn Dayoan
*Assistant Examiner* — Pinel Romain
(74) *Attorney, Agent, or Firm* — Greenblum & Bernstein, P.L.C.

(57) ABSTRACT

A vehicle sun visor includes a sun visor main body, an auxiliary visor provided on the sun visor main body, and a support mechanism that is provided between the sun visor main body and the auxiliary visor and supports the auxiliary visor with respect to the sun visor main body so as to be movable along a longitudinal direction of the sun visor main body and so as to be rotatable about an axis orthogonal to the longitudinal direction of the sun visor main body.

14 Claims, 9 Drawing Sheets

FOREIGN PATENT DOCUMENTS

JP          2004-196030 A    7/2004

OTHER PUBLICATIONS

English language Abstract and translation of JP 2004-196030 A.
English language Abstract and translation of JP 8-053025 A.
English language Abstract and translation of JP 2004-142582 A.
English language Abstract and translation of JP 2002-002278 A.
English language Abstract and translation of JP 2002-178750 A.
English language Abstract and translation of JP 7-266877 A.
China Office action, dated Nov. 26, 2010 along with an english translation thereof.
Chinese Office action, dated Feb. 29, 2012 along with an English language translation thereof.

* cited by examiner

VEHICLE SUN VISOR

INCORPORATION BY REFERENCE

The disclosure of Japanese Patent Application No. 2008-122734 filed on May 8, 2008, including the specification, drawings and abstract is incorporated herein by reference in its entirety.

BACKGROUND OF THE INVENTION

1. Field of the Invention

The present invention relates to a vehicle sun visor, and in particular, relates to a vehicle sun visor having a high degree of freedom in positional adjustment of an auxiliary visor with respect to a sun visor main body.

2. Description of the Related Art

Up until now, a sun visor has generally been provided on an upper portion of the windshield of a vehicle such as an automobile mainly to shade the front seats. This type of sun visor is known to include an auxiliary visor provided on a sun visor main body (refer to Patent Documents 1 and 2, for example).

In Patent Documents 1 and 2, a sun visor is disclosed which supports an auxiliary visor so as to be slidable to the right and left with respect to a sun visor main body. The auxiliary visor may protrude from one side portion of the sun visor main body as required in order to enlarge the shading range.

[Patent Document 1] Japanese Patent Application Publication No. JP-A-2003-165332

[Patent Document 1] Japanese Patent Application Publication No. JP-A-2004-196030

However, in Patent Documents 1 and 2, since the auxiliary visor only slides to the right and left with respect to the sun visor main body, difficulties are encountered in shading both the front and sides of a vehicle occupant. Thus, the shading range of the auxiliary visor has a low degree of freedom. Furthermore, when various functional parts (such as mirrors or cardholders, for example) are provided in the auxiliary visor, it is difficult to place the functional parts near the occupant.

SUMMARY OF THE INVENTION

The present invention has been devised in view of the above problems, it is an object thereof to provide a vehicle sun visor having a high degree of freedom in positional adjustment of an auxiliary visor with respect to a sun visor main body.

According to a non-limiting embodiment of the present application a vehicle sun visor is provided and may include a sun visor main body, an auxiliary visor provided on the sun visor main body, and a support mechanism that is provided between the sun visor main body and the auxiliary visor, and that supports the auxiliary visor such that the auxiliary visor is movable with respect to the sun visor main body along a longitudinal direction of the sun visor main body and rotatable about an axis orthogonal to the longitudinal direction of the sun visor main body.

According to another non-limiting embodiment, the auxiliary visor may be rotatable at any position along the longitudinal direction of the sun visor main body.

According to a further non-limiting embodiment, the support mechanism may include a sliding groove and a sliding shaft, the sliding groove being formed on the sun visor main body and extending along the longitudinal direction of the sun visor main body, and the sliding shaft being provided on one end of the auxiliary visor so as to extend in a direction orthogonal to the longitudinal direction of the sun visor main body and supported so as to be movable and rotatable in the sliding groove.

According to yet another non-limiting embodiment, the sliding groove may be formed across the entire length of the longitudinal direction of the sun visor main body.

According to a non-limiting embodiment, the vehicle sun visor may include a rotation regulating mechanism that regulates rotation of the auxiliary visor when the auxiliary visor is accommodated in the sun visor main body.

According to another non-limiting embodiment, one of the sun visor main body and at least two of the auxiliary visors may be provided.

According to a further non-limiting embodiment, the auxiliary visor may include a front side and a rear side and may be accommodated in the sun visor main body such that the auxiliary visor is rotatable 180 degrees between a first accommodating state where the front side of the auxiliary visor faces a seat occupant and a second accommodating state where the rear side of the auxiliary visor faces the seat occupant.

In a vehicle sun visor according to some aspects of the present invention, the auxiliary visor is supported by the support mechanism so as to be movable and rotatable with respect to the sun visor main body. Consequently, the degree of freedom in the positional adjustment of the auxiliary visor with respect to the sun visor main body is higher than a related-art example in which the auxiliary visor can only move with respect to the sun visor main body. For example, it is possible to shade both the front and sides of a vehicle occupant and to place the auxiliary visor near the occupant by rotating and raising the auxiliary visor with respect to the sun visor main body. Furthermore, when various functional parts are provided on both front and rear surfaces of the auxiliary visor, the functional parts on both surfaces can be effectively used by rotating the auxiliary visor with respect to the sun visor main body.

Furthermore, the support mechanism may include the sliding groove and the sliding shaft. The sliding groove may be formed on the sun visor main body and extend along a longitudinal direction of the sun visor main body. The sliding shaft may be provided on one end of the auxiliary visor so as to extend in a direction orthogonal to the longitudinal direction of the sun visor main body and may be supported so as to be movable and rotatable in the sliding groove. In this case, the sliding groove can be used for supporting both rotation and movement of the sliding shaft, and thus, manufacture of the support mechanism can be simplified.

Furthermore, when the sliding groove is formed across the entire length in the longitudinal direction of the sun visor main body, the auxiliary visor can project considerably to both the right and left sides with respect to the sun visor main body. This allows more effective shading on the right and left sides of the sun visor main body.

When the rotation regulating mechanism is further provided to regulate the rotation of the auxiliary visor when the auxiliary visor is accommodated in the sun visor main body, opening and rotation of the auxiliary visor caused by long-time vibration during vehicle operation are prevented.

When one sun visor main body and at least two auxiliary visors are provided, the two or more auxiliary visors can be moved and rotated with respect to the single sun visor main body, and thus, more complicated positional adjustment can be realized.

BRIEF DESCRIPTION OF THE DRAWINGS

FIGS. 2A to 2I are explanatory views showing the operation of the vehicle sun visor;

FIGS. 9A to 9G are explanatory views showing an operation of the vehicle sun visor;

FIGS. 10A to 10I are explanatory views showing the operation of the vehicle sun visor;

DETAILED DESCRIPTION OF THE PREFERRED EMBODIMENTS

1. Vehicle Sun Visor

A vehicle sun visor according to a first embodiment of the present invention includes a sun visor main body, an auxiliary visor, and a support mechanism as described hereafter. The vehicle sun visor may further include a rotation limiting mechanism described below, for example.

The "sun visor main body" is not particularly limited in terms of structure, size, shape, material, number, or the like, provided that the sun visor main body is attached to the ceiling of a vehicle or the like via a universal coupling or the like so as to shade the interior of a vehicle compartment.

Various functional parts may be provided on the front surface and/or the rear surface of the sun visor main body, for example. Examples of the functional parts may include one type or a combination of two or more types of the following: mirrors, cardholders, secret boxes, net pockets, display monitors such as liquid crystal displays, or smoke acrylate plate for shading.

The "auxiliary visor" is not particularly limited in terms of structure, size, shape, material, number, or the like, provided that the auxiliary visor is provided on the sun visor main body. The auxiliary visor typically exerts the function of enlarging the shading range of the sun visor main body.

Various functional parts may be provided on the front surface and/or rear surface of the auxiliary visor, for example. Examples of the functional parts may include one type or a combination of two or more types of the following: mirrors, cardholders, secret boxes, net pockets, display monitors such as liquid crystal displays, or smoke acrylate plate for shading.

The "support mechanism" is not particularly limited in terms of structure, mode of support, installation, or the like, provided that the support mechanism is disposed between the sun visor main body and the auxiliary visor and supports the auxiliary visor with respect to the sun visor main body such that the auxiliary visor can move along a longitudinal direction of the sun visor main body and can rotate about an axis orthogonal to the longitudinal direction of the sun visor main body. The axis normally extends in a planer direction of the sun visor main body.

The term "orthogonal to a longitudinal direction" includes a substantially orthogonal orientation slightly deviating in a longitudinal direction provided that the auxiliary visor can rotate with respect to the sun visor main body. This point will also be applied to the description below.

The support mechanism may have: an arrangement (1) (refer to FIG. 1) including a sliding groove formed on the sun visor main body and extending along a longitudinal direction L of the sun visor main body and a sliding shaft formed at one end of the auxiliary visor so as to extend in a direction orthogonal to the longitudinal direction of the sun visor main body and supported in the sliding groove so as to be movable and rotatable; or an arrangement (2) (refer to FIG. 11) including a sliding groove formed on the sun visor main body and extending along a longitudinal direction L of the sun visor main body and a sliding shaft supported at one end of the auxiliary visor so as to be rotatable about an axis C that is orthogonal to the longitudinal direction L of the sun visor main body and supported in the sliding groove so as to be movable but not rotatable, for example.

In arrangement (1), since the sliding groove can be used for supporting both rotation and movement of the sliding shaft, the support mechanism can include a simpler structure. In arrangement (2), since the auxiliary visor can be rotatably supported by a relatively long sliding shaft, the support mechanism can include a stronger structure.

In arrangements (1) and (2), the sliding groove may be formed in the sun visor main body across the entire length in the longitudinal direction thereof, for example.

In arrangement (1), for example, the sliding groove is formed in a rubber member mounted on the sun visor main body and the sliding shaft is press fitted into the sliding groove and is supported so as to be movable and rotatable. Therefore, the sliding shaft receives a strong interference due to friction with the sliding groove, and thus can retain the auxiliary visor to a desired position or angle.

The "rotation regulating mechanism" is not particularly limited in terms of structure, mode of regulation, installation, or the like, provided that the rotation regulating mechanism regulates the rotation of the auxiliary visor when the auxiliary visor is accommodated in the sun visor main body.

The term "accommodated" means a state in which substantially the entire front surface of the auxiliary visor is stacked on the front surface of the sun visor main body.

The rotation regulating mechanism may have: an arrangement (1) including a ball plunger provided on one of the auxiliary visor and the sun visor main body and an engaged portion which is provided on the other of the auxiliary visor and the sun visor main body and with which the ball of the ball plunger engages; or an arrangement (2) including a projecting engaging portion provided on one of the auxiliary visor and the sun visor main body and a recessed engaged portion which is provided on the other of the auxiliary visor and the sun visor main body and with which the engaging portion engages.

In arrangements (1) and (2), the engaged portion may be the sliding groove included in the support mechanism. By this, the sliding groove of the support mechanism can be used as a constituting portion of the rotation regulating mechanism, and thus, the number of components and the costs can be reduced.

The vehicle sun visor according to the first embodiment may be provided with one sun visor main body and at least two auxiliary visors (refer to FIGS. 9A to 9G and FIGS. 10A to 10I).

Embodiments

Hereinafter, an embodiment of the present invention will be described in further detail, with reference to the figures. In the present embodiment, description will be made on a case in which a vehicle sun visor is used at a driver's seat or a front passenger seat of an automobile.

(1) Structure of Vehicle Sun Visor

As shown in FIG. 1 and FIGS. 2A to 2I, a vehicle sun visor 1 according to the present embodiment includes a sun visor main body 2, an auxiliary visor 3 provided on the sun visor main body 2, and a support mechanism 4 provided between the sun visor main body 2 and the auxiliary visor 3.

Figure 1:
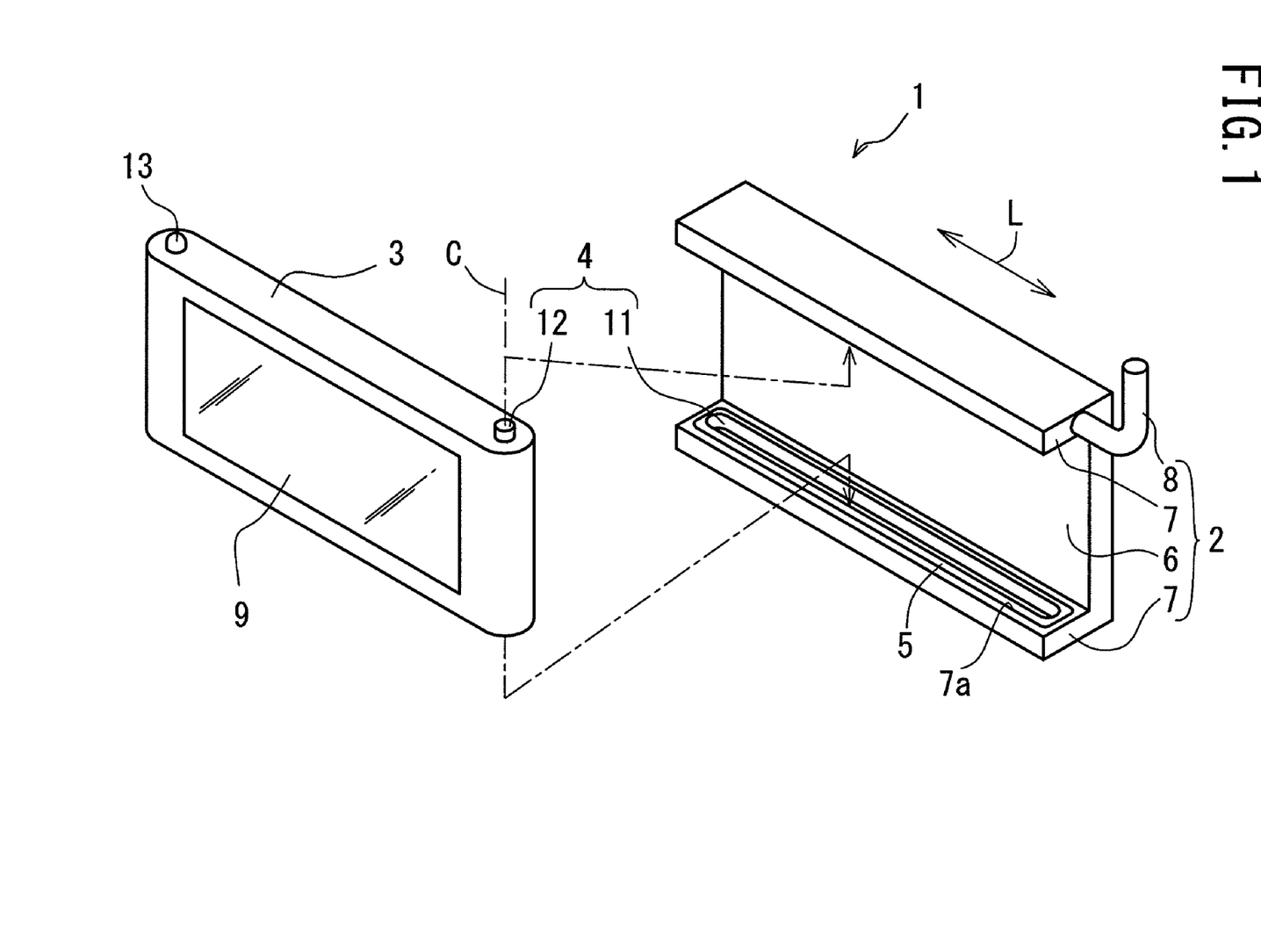
FIG. 1 is an exploded perspective view showing a vehicle sun visor according to an embodiment of the present invention.

The sun visor main body 2 includes a shading plate 6 which is long in the longitudinal direction and has a plate shape, a flange 7 formed on both upper and lower edges of the shading plate 6, and a support shaft 8 provided at one end of the shading plate 6. A distal end of the support shaft 8 is attached to the ceiling of the automobile via a universal coupling and adjusts the position of the shading plate 6 so that the interior of the compartment, especially vision of an occupant, can be shaded.

The auxiliary visor 3 is formed substantially in a plate shape, which is slightly smaller than the shading plate 6. A mirror 9 is provided on one surface and a cardholder 10 is provided on the other surface.

The support mechanism 4 includes a sliding groove 11 extending substantially across the entire length in a longitudinal direction L of the sun visor main body 2 and a columnar sliding shaft 12 provided on one end of the auxiliary visor 3 so as to extend in a vertical direction. The sliding groove 11 is formed on an upper surface of a rubber member 5 recessed along a recessed portion 7a formed on an inner surface of each of the upper and lower flanges 7. The sliding shaft 12 is press fitted into the sliding groove 11 and supported so as to be movable and rotatable. Thus, the auxiliary visor 3 is supported with respect to the sun visor main body 2 so as to be movable along the longitudinal direction L of the sun visor main body 2 and is supported so as to be rotatable about an axis C that is orthogonal to the longitudinal direction L of the sun visor main body 2.

Figure 2A:
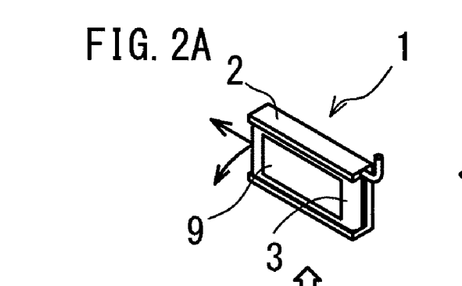
Figure 2B:
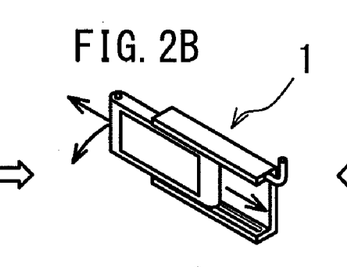
Figure 2C:
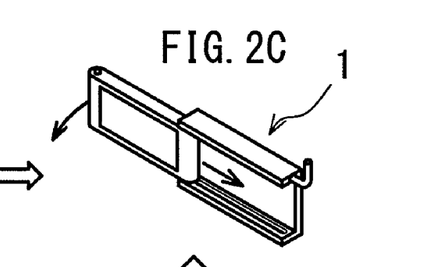
Figure 2D:
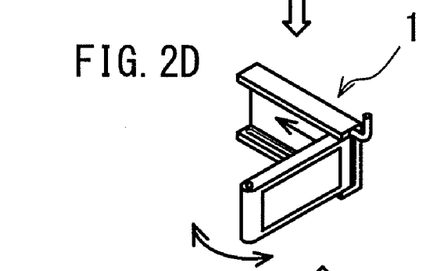
Figure 2E:
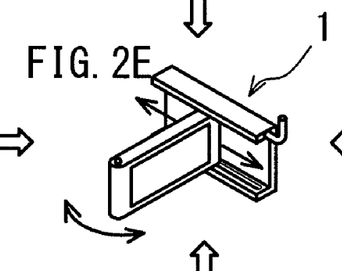
Figure 2F:
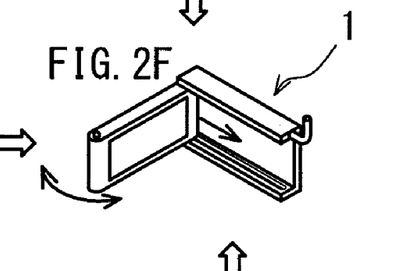

In the auxiliary visor 3, a known ball plunger 13 is provided on an upper portion of the other end that is opposite the end provided with the sliding shaft 12. The ball of the ball plunger 13 is engaged in the sliding groove 11 when the auxiliary visor 3 is accommodated in the sun visor main body 2, that is to say, when substantially the entire surface of the auxiliary visor 3 is stacked on substantially the entire surface of the sun visor main body 2, as shown in FIGS. 2A and 2I.

The "rotation regulating mechanism" according to an aspect of the present invention is constituted by the ball plunger 13 and the sliding groove 11.

(2) Operation of Vehicle Sun Visor

The operation of the vehicle sun visor 1 will be described hereafter.

In a first accommodating state of the auxiliary visor 3, the auxiliary visor 3 is accommodated in the sun visor main body 2 with the mirror 9 being on a front side (refer to FIG. 2A). In this state, when the auxiliary visor 3 is moved to the left, the shading range to the left of the sun visor main body 2 is enlarged by the auxiliary visor 3 and the amount of projection of the auxiliary visor 3 from the sun visor main body 2 is adjusted to provide a desired range of shading (refer to FIGS. 2B and 2C).

When the auxiliary visor 3 is rotated from the first accommodating state, the mirror 9 can be placed near the face of an occupant. Here, the mirror 9 can be used as a mirror for checking the rear passenger seats or as a rearview mirror by appropriately adjusting the angle of the mirror 9. Furthermore, the auxiliary visor 3 can shade both the front and right sides when rotated 90 degrees (refer to FIG. 2D). In this state as well, the auxiliary visor 3 can be slid to provide a desired range of shading (refer to FIGS. 2E and 2F).

Figure 2G:
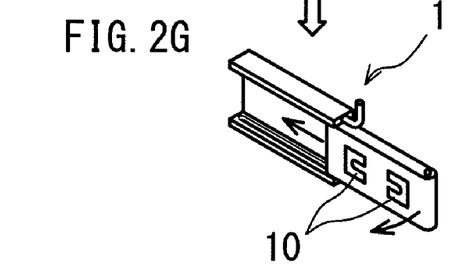
Figure 2H:
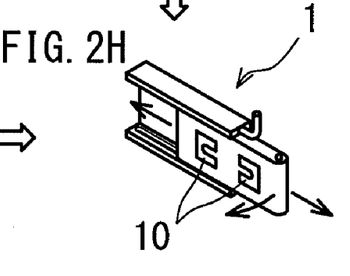
Figure 2I:
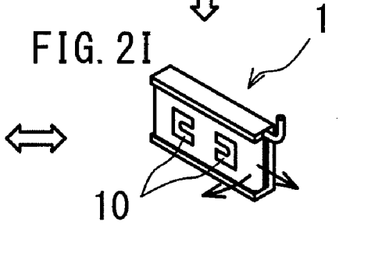

When the auxiliary visor 3 is rotated 180 degrees from the first accommodating state, the shading range to the right of the sun visor main body 2 can be extended by the auxiliary visor 3 (refer to FIG. 2G). Furthermore, the amount of projection of the auxiliary visor 3 from the sun visor main body 2 can be adjusted to provide a desired range of shading (refer to FIGS. 2H and 2I). Moreover, the auxiliary visor 3 can be accommodated in the sun visor main body 2, with the cardholder 10 being on the front side (refer to FIG. 2I for a second accommodating state).

(3) Effects of the Embodiment

According to the vehicle sun visor 1 in the present embodiment, the auxiliary visor 3 is supported by the support mechanism 4 so as to be movable and rotatable with respect to the sun visor main body 2. Therefore, there is a greater degree of freedom in the positional adjustment of the auxiliary visor 3 with respect to the sun visor main body 2 than a related-art example in which the auxiliary visor only moves with respect to the sun visor main body. As a result, when the auxiliary visor 3 is rotated so as to be raised with respect to the sun visor main body 2, both the front and sides of an occupant can be shaded at the same time and the mirror 9 on the auxiliary visor 3 can be placed near an occupant. Furthermore, the mirror 9 and the cardholder 10 provided on front and rear surfaces, respectively, of the auxiliary visor 3 can be effectively used by rotating the auxiliary visor 3 with respect to the sun visor main body 2.

In this embodiment, the support mechanism 4 includes the sliding groove 11 formed on the sun visor main body 2 and extending along the longitudinal direction L of the sun visor main body 2 and the sliding shaft 12 provided at one end of the auxiliary visor 3 so as to extend in a direction orthogonal to the longitudinal direction L of the sun visor main body 2 and supported so as to be movable and rotatable in the sliding groove 11. Therefore, the sliding groove 11 can be used for supporting both movement and rotation of the sliding shaft 12, and thus, manufacture of the support mechanism 4 can be simplified.

In this embodiment, since the sliding shaft 12 is press fitted into the sliding groove 11 formed in the rubber member 5 and is supported so as to be movable and rotatable, the sliding shaft 12 receives a strong interference due to friction with the sliding groove 11 and can retain the auxiliary visor 3 at a desired position or angle.

In this embodiment, since the sliding groove 11 is formed across the entire length in the longitudinal direction of the sun visor main body 2, the auxiliary visor 3 can project considerably to both the right and left sides of the sun visor main body 2. Therefore, more effective shading of both the right and left sides of the sun visor main body 2 is possible.

In this embodiment, the ball plunger 13 regulating the rotation of the auxiliary visor 3 is provided, with the auxiliary visor 3 accommodated in the sun visor main body 2. Thus the auxiliary visor 3 can be prevented from rotating to open due to long-term vibration during vehicle operation.

In this embodiment, since the ball of the ball plunger 13 is engaged in the sliding groove 11 forming the support mechanism 4, the number of components and thus costs can be reduced.

Since the auxiliary visor 3 according to this embodiment can be used in both right and left vehicle sun visors 1, the number of components and thus costs can be reduced.

The present invention is not limited to this embodiment, and various modified embodiments are possible within the scope of the present invention depending on a purpose or use. In other words, although a mirror 9 and a cardholder 10 are provided on the auxiliary visor 3 in this embodiment, the present invention is not limited to this. For example, a secret box, a net pocket, a liquid crystal monitor, a smoke acrylate plate for shading or the like may be appropriately used by selection. Thus, a variety of product specifications are possible.

Figure 3:
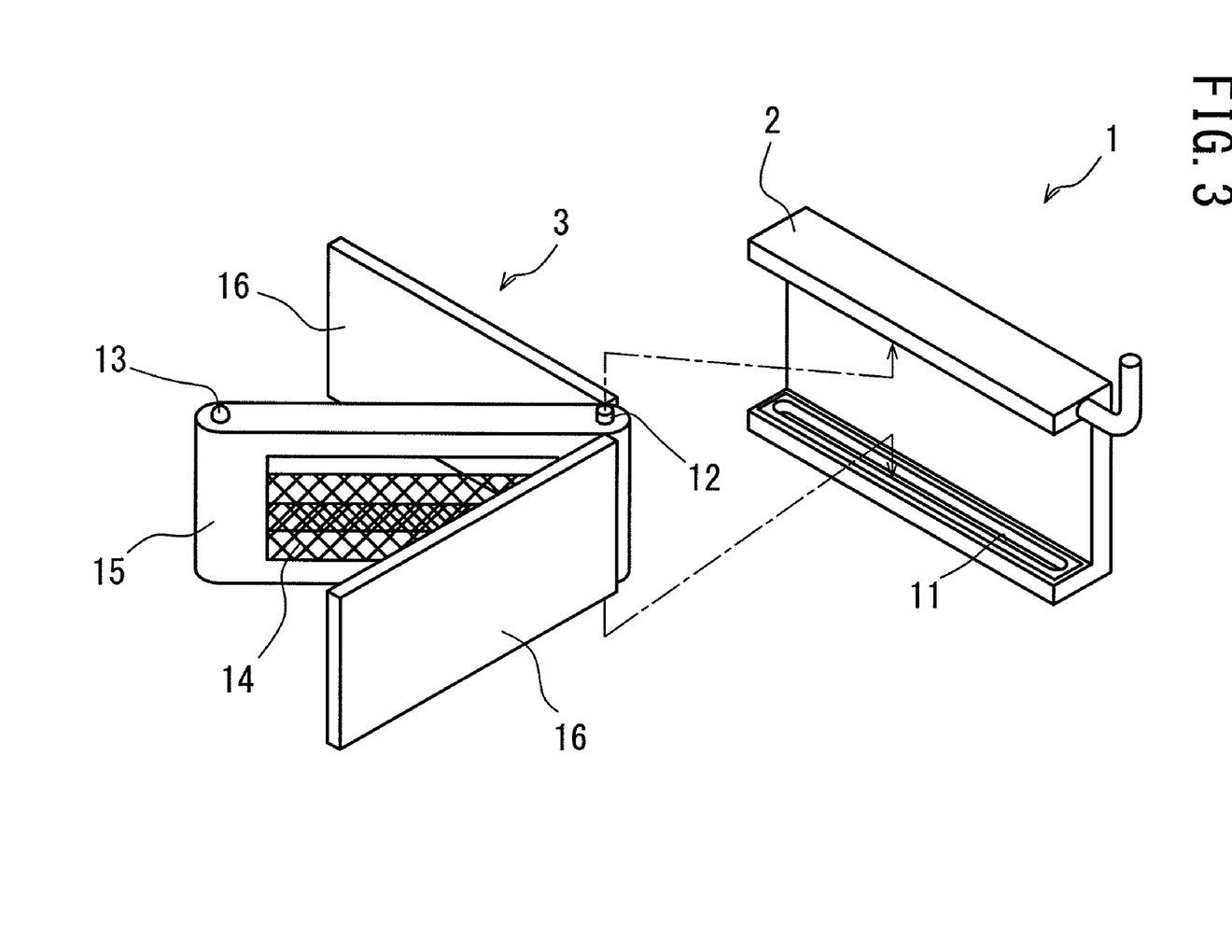
FIG. 3 is an exploded perspective view showing a vehicle sun visor according to another embodiment of the present invention.
Figure 4:
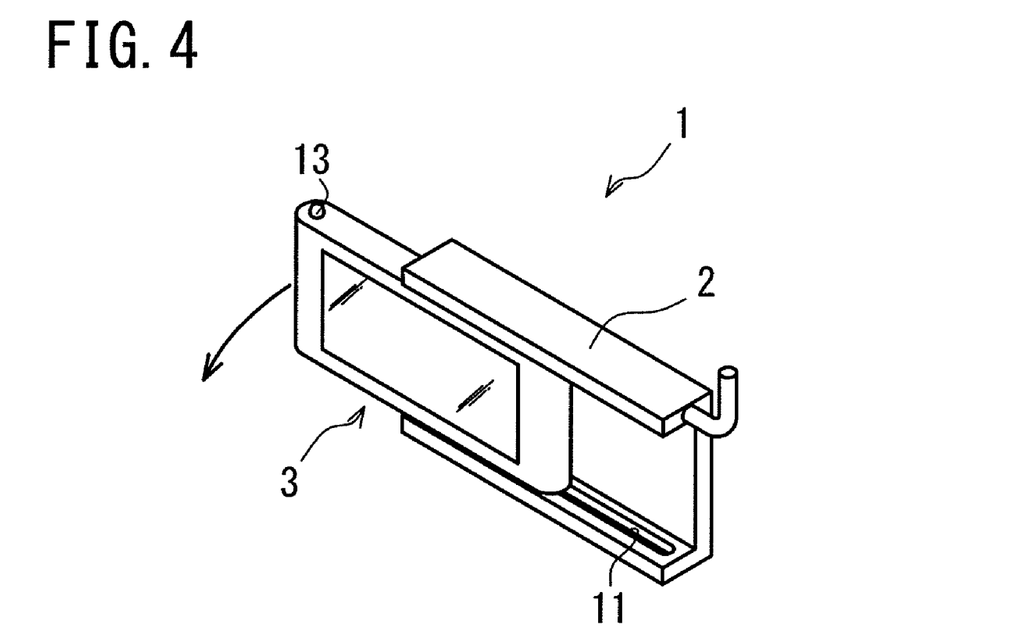
FIG. 4 is a perspective view showing a vehicle sun visor according to yet another embodiment of the present invention.
Figure 5:
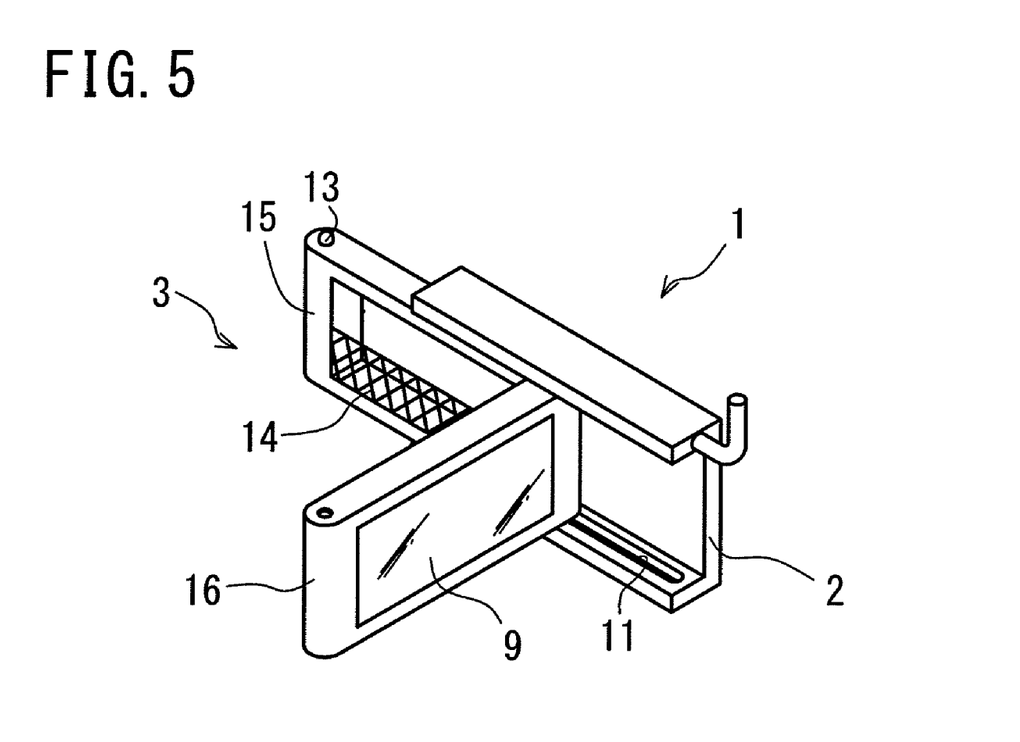
FIG. 5 is a perspective view showing the cover of the vehicle sun visor in an opened state.
Figure 6:
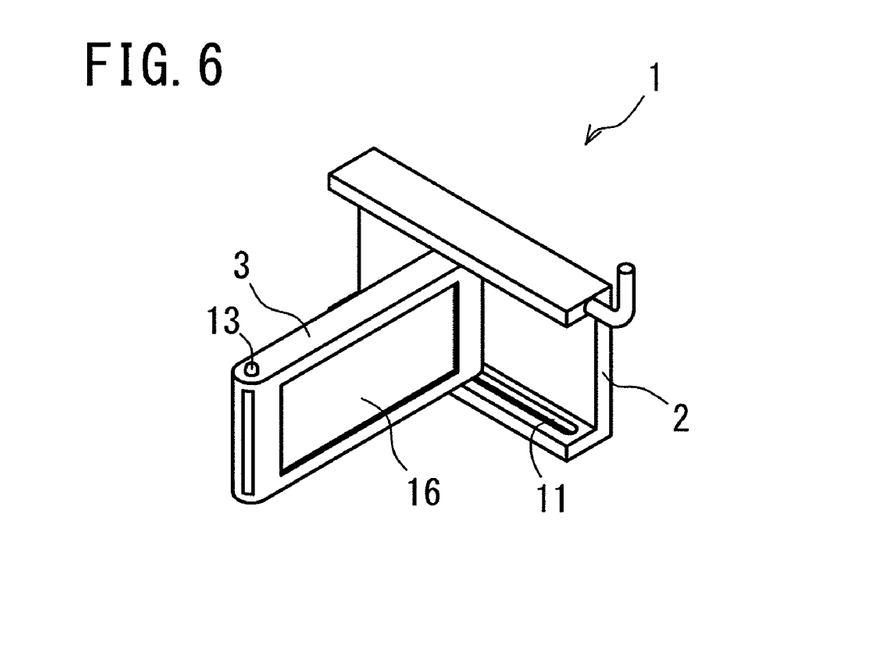
FIG. 6 is a perspective view showing a vehicle sun visor according to yet another embodiment of the present invention.
Figure 7:
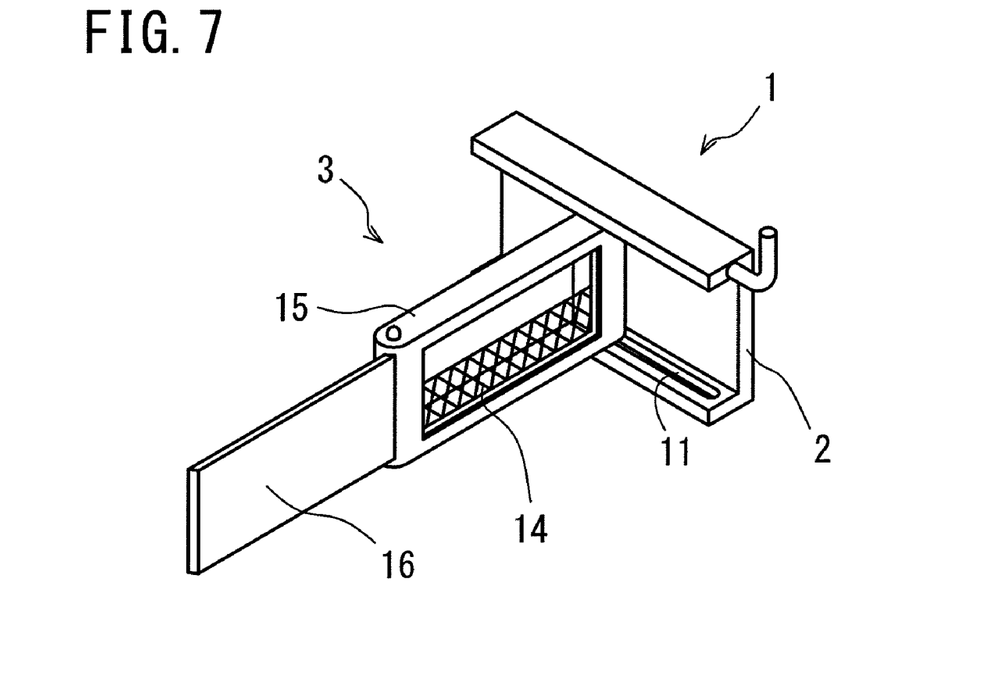
FIG. 7 is a perspective view showing a cover of the vehicle sun visor in an opened state.

When using a secret box, for example as shown in FIG. 3, the auxiliary visor 3 includes an auxiliary visor main body 15 having a net pocket 14 inside thereof, and a pair of cover plates 16 provided on both front and rear surfaces of the auxiliary visor main body 15 via a hinge or the like so as to be able to open and close. Thus, since the net pocket 14 inside is covered when the cover plates 16 are closed, valuables such as credit cards can be stored. Moreover, the mirror 9, the cardholder 10 or the like may be provided on the front side of the cover plate 16. Furthermore, as shown in FIG. 4 and FIG. 5, a cover plate 16 capable of opening and closing may be provided only on one side of the auxiliary visor main body 15. As shown in FIG. 6 and FIG. 7, a cover plate 16 capable of sliding with respect to the auxiliary visor main body 15 may be provided in order to cover the net pocket 14 inside. Since this arrangement allows the cover plate 16 to function as an extender with respect to the auxiliary visor 3, the shading range can be further increased. Furthermore, by providing the mirror 9 and the cardholder 10, for example, on the front and rear surfaces of the cover plate 16, such parts can be used simply by reversing the cover plate 16.

Figure 8:
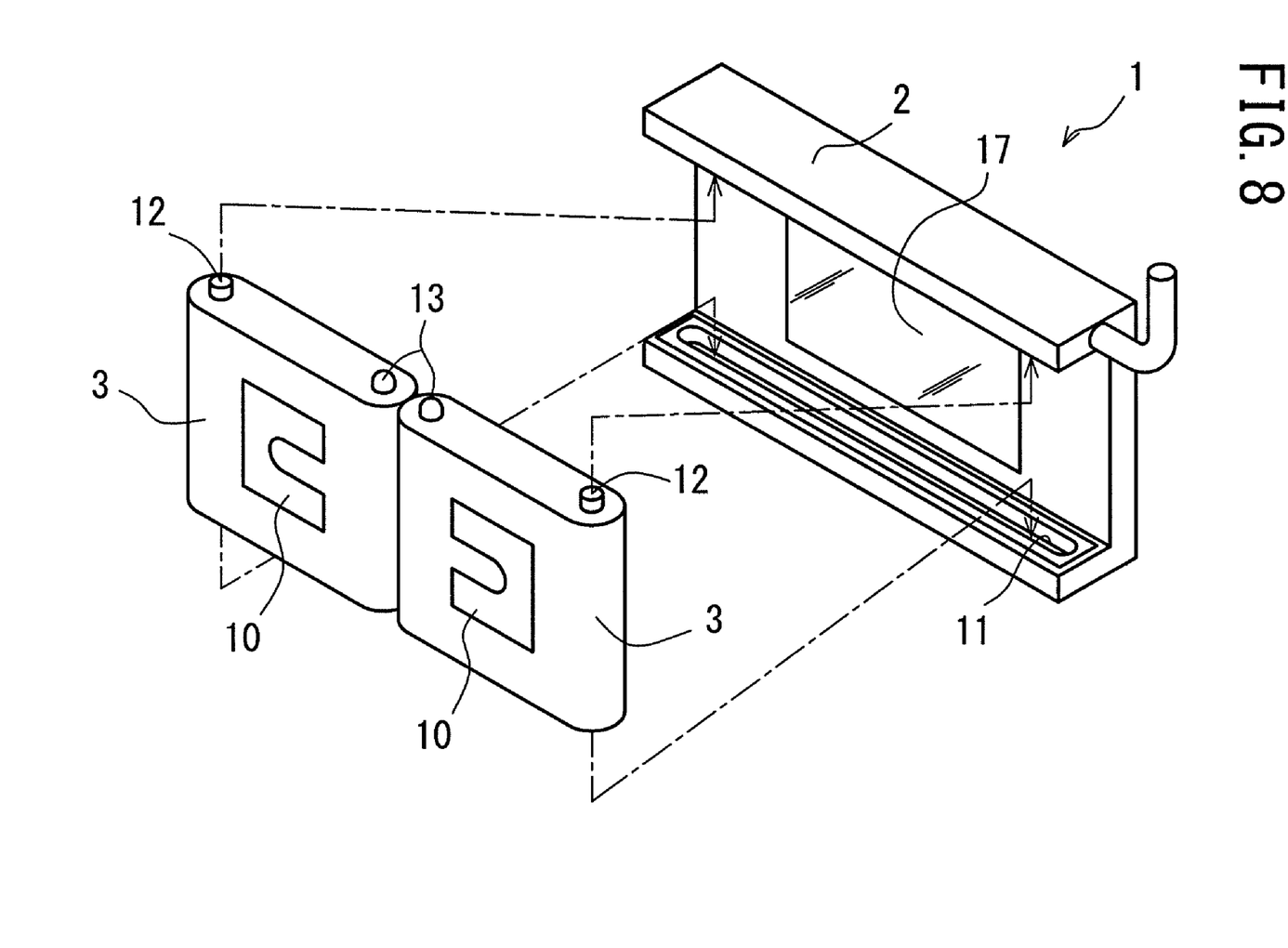
FIG. 8 is an exploded perspective view showing a vehicle sun visor according to yet another embodiment of the present invention.

In the above-described embodiment, a single auxiliary visor 3 is provided with respect to a single sun visor main body 2. However, the present invention is not limited to this, and a plurality of auxiliary visors 3 may be provided. For example, as shown in FIG. 8, two auxiliary visors 3 may be provided for a single sun visor main body 2. In this case, mirrors 9 and 17 are provided on an inner side of the sun visor main body 2 and an inner side of each auxiliary visor 3. These three mirrors 9, 9, and 17 can be used as a triple mirror. In this arrangement, the outer side surface of each auxiliary visor 3 functions as a cardholder 10.

Figure 9A:
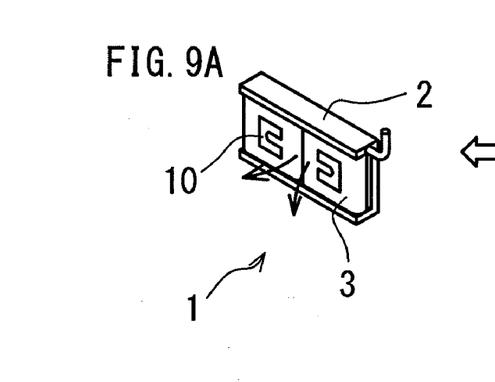
Figure 9B:
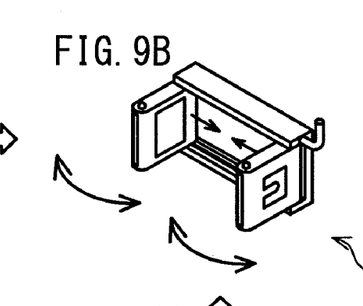
Figure 9C:
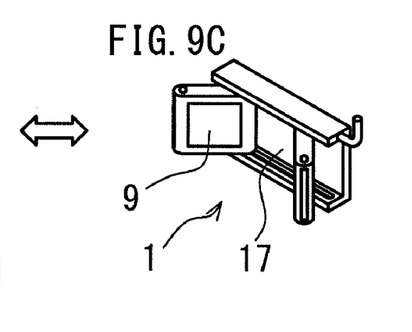
Figure 9D:
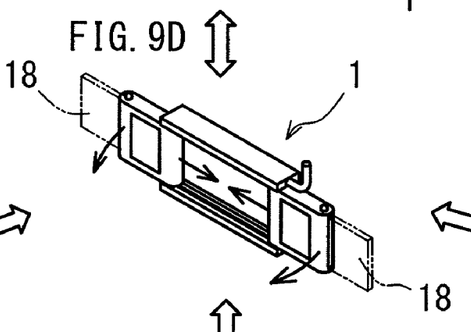
Figure 9E:
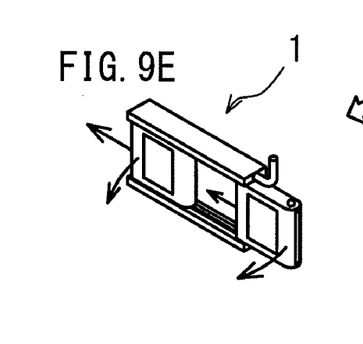
Figure 9F:
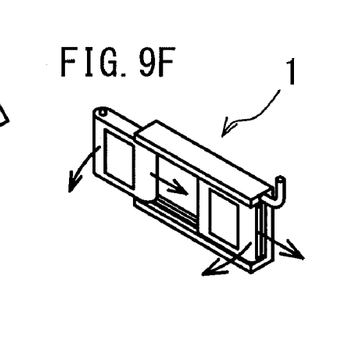
Figure 9G:
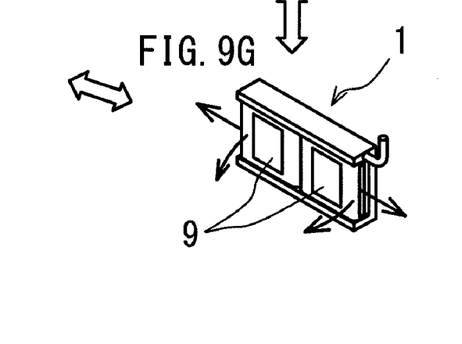

In other words, as shown in FIGS. 9A to 9G, when the auxiliary visor 3 is not in use, the auxiliary visor 3 is accommodated in the sun visor main body 2 with the cardholder 10 being on the front side (refer to FIG. 9A for a first accommodating state). Rotation of each auxiliary visor 3 (refer to FIG. 9B) allows for use as a triple mirror when the position and angle thereof are suitably adjusted (refer to FIG. 9C). Thus, the convenience afforded to occupants is further increased. Furthermore, the range of shading both on the right and left sides can be simultaneously increased by extending each auxiliary visor 3 on both sides (refer to FIG. 9D). It is preferred that an extender 18 is provided on each auxiliary visor 3 to slidably project towards a distal end. By this, reduction in the shading range can be prevented even when the overall length of the vehicle sun visor with a plurality of auxiliary visors 3 is shorter than that with a single auxiliary visor 3. Since each auxiliary visor 3 can move independently, projection only to the right (refer to FIG. 9E) or conversely projection only to the left (refer to FIG. 9F) is possible. Also, each auxiliary visor 3 can be accommodated with the mirror 9 being on the front side (a second accommodating state, refer to FIG. 9G).

Figure 10A:
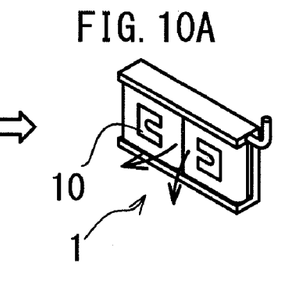
Figure 10B:
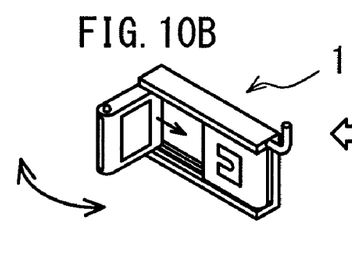
Figures 10C, 10D:
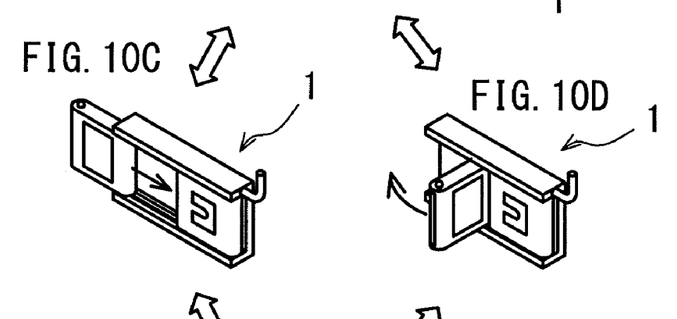
Figure 10E:
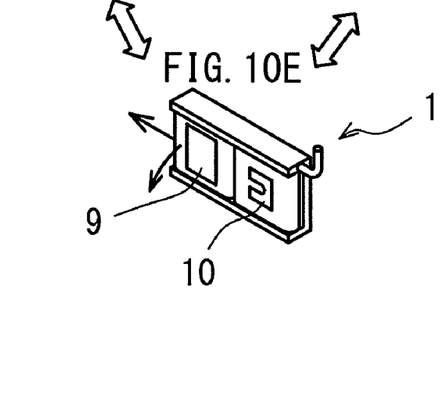
Figure 10F:
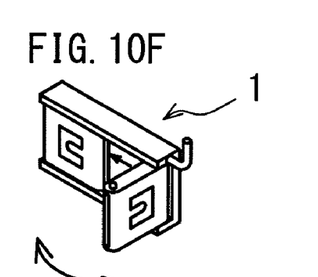
Figures 10G, 10H:
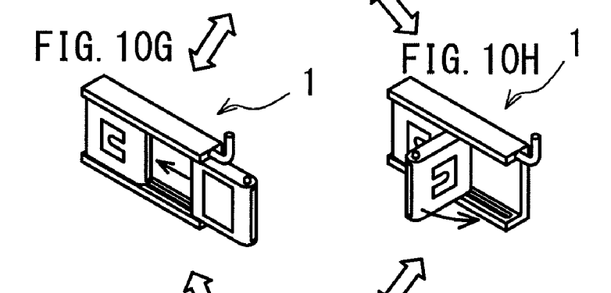
Figure 10I:
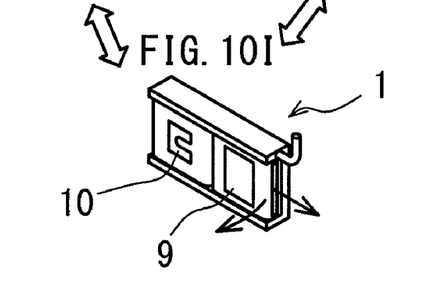

As shown in FIGS. 10A to 10I, when the vehicle sun visor 1 is in a first accommodating state (refer to FIG. 10A), an arrangement can be achieved in which the mirror 9 is on the left and the cardholder 10 is on the right (refer to FIG. 10E), by rotating the left auxiliary visor 3 for example (refer to FIG. 10B), opening 180 degrees, and sliding inwardly (refer to FIG. 10C), or alternatively, by inwardly sliding the left auxiliary visor 3 while maintaining it at 90 degrees, and then rotating it (refer to FIG. 10D). Conversely, another arrangement can be achieved in which the mirror 9 is on the right and the cardholder 10 is on the left (refer to FIG. 10I), by rotating the right auxiliary visor 3 (refer to FIG. 10F), opening 180 degrees, and sliding inwardly (refer to FIG. 10G), or by inwardly sliding the right auxiliary visor 3 while maintaining it at 90 degrees, and then rotating it (refer to FIG. 10H).

Figure 11:
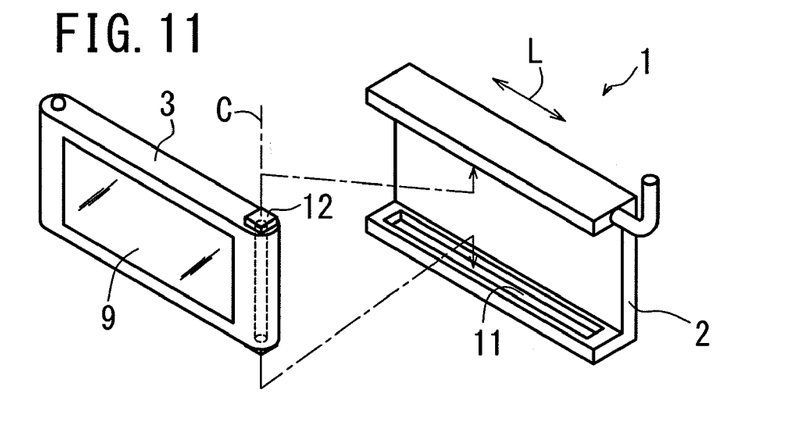
FIG. 11 is an exploded perspective view showing a vehicle sun visor according to yet another embodiment of the present invention.

In the above-described embodiment, the sliding shaft 12 fixed to the auxiliary visor 3 is rotated with respect to the sun visor main body 2. However, the present invention is not limited to this. For example, as shown in FIG. 11, it may be configured such that the sliding shaft 12 is supported so as to be movable but not rotatable with respect to the sliding groove 11, and the auxiliary visor 3 is supported so as to be rotatable with respect to the sliding shaft 12. In this case, the auxiliary visor 3 can be supported so as to be freely rotatable on the entire length of the sliding shaft 12, which increases the supporting strength.

Figure 12:
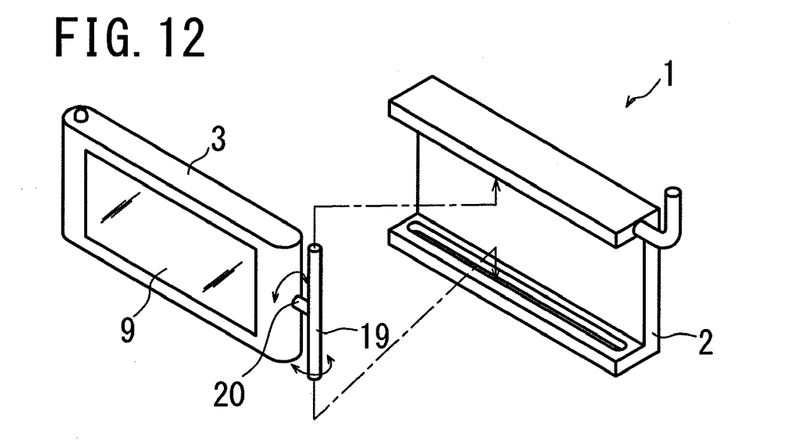
FIG. 12 is an exploded perspective view showing a vehicle sun visor according to yet another embodiment of the present invention.
Figure 13:
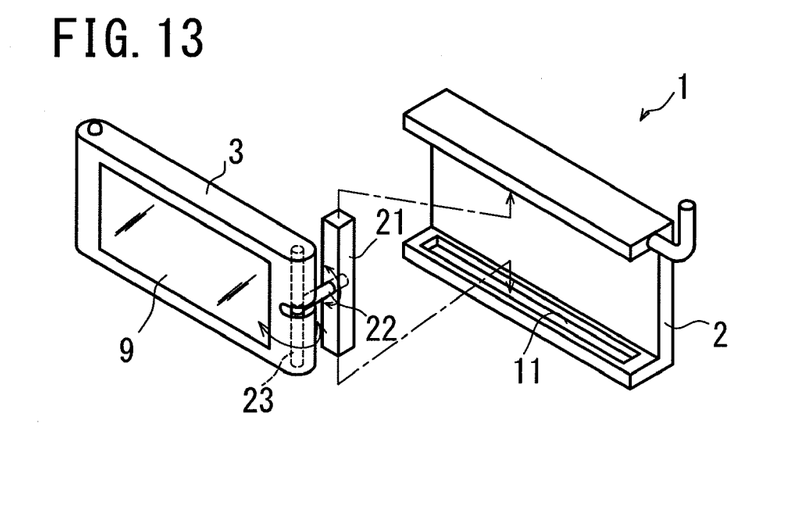
FIG. 13 is an exploded perspective view showing a vehicle sun visor according to yet another embodiment of the present invention.

In the above-described embodiment, an example is described of the support mechanism 4 supporting only with a single sliding shaft 12. However, the present invention is not limited to this, and for example, a support mechanism using two or more shafts may be employed. For example, as shown in FIG. 12, the support mechanism may include a shaft member 19 movable and rotatable with respect to the sun visor main body 2 and a support shaft 20 rotatably provided in a perpendicular direction with respect to the shaft member 19 and may support the auxiliary visor 3 using the support shaft 20. For example, as shown in FIG. 13, the support mechanism may include a slider 21 movable but not rotatable with respect to the sun visor main body 2, a middle shaft 22 rotatably provided in a perpendicular direction with respect to the slider 21, and a support shaft 23 rotatably provided in a perpendicular direction with respect to the middle shaft 22, and may support the auxiliary visor 3 using the support shaft 23. In either case, the rotation of the auxiliary visor 3 about an axis in the longitudinal direction thereof is possible as a result of supporting with two or more shafts. Thus, an even higher degree of freedom is obtained, which is suitable when using as a mirror 9 for checking the rear seats or as a rearview mirror 9.

In the above embodiments, examples are described, in which the auxiliary visor 3 is hand-operated. However, the present invention is not limited to this, and for example, an electrically operated auxiliary visor using a drive motor or the like may be employed.

The present invention can be widely used as a technique for shading the interior of a vehicle compartment or the like.

What is claimed is:

1. A vehicle sun visor, comprising:
   a sun visor main body;
   an auxiliary visor provided on said sun visor main body; and
   a support mechanism that is provided between said sun visor main body and said auxiliary visor, and that supports said auxiliary visor such that said auxiliary visor is movable with respect to said sun visor main body along a longitudinal direction of said sun visor main body and rotatable about an axis orthogonal to the longitudinal direction of said sun visor main body,
   wherein said auxiliary visor is rotatable at any position along the longitudinal direction of said sun visor main body,
   wherein said support mechanism comprises a sliding groove and a sliding shaft, said sliding groove being formed within said sun visor main body and extending along the longitudinal direction of said sun visor main body, and said sliding shaft being provided on one end of said auxiliary visor so as to extend in a direction orthogonal to the longitudinal direction of said sun visor main body and supported so as to be movable and rotatable in said sliding groove, and
   wherein said auxiliary visor includes a front side and a rear side and is accommodated within said sun visor main body such that said auxiliary visor is rotatable 180 degrees between a first accommodating state where the front side of said auxiliary visor faces a seat occupant and a second accommodating state where the rear side of said auxiliary visor faces the seat occupant.

2. The vehicle sun visor according to claim 1, wherein said sliding groove is formed across the entire length of the longitudinal direction of said sun visor main body.

3. The vehicle sun visor according to claim 1, further comprising a rotation regulating mechanism that regulates rotation of said auxiliary visor when said auxiliary visor is accommodated in said sun visor main body.

4. The vehicle sun visor according to claim 2, further comprising a rotation regulating mechanism that regulates rotation of said auxiliary visor when said auxiliary visor is accommodated in said sun visor main body.

5. The vehicle sun visor according to claim 1, wherein one said sun visor main body and at least two said auxiliary visors are provided.

6. The vehicle sun visor according to claim 1, wherein one said sun visor main body and at least two said auxiliary visors are provided.

7. The vehicle sun visor according to claim 2, wherein one said sun visor main body and at least two said auxiliary visors are provided.

8. The vehicle sun visor according to claim 3, wherein one said sun visor main body and at least two said auxiliary visors are provided.

9. The vehicle sun visor according to claim 4, wherein one said sun visor main body and at least two said auxiliary visors are provided.

10. The vehicle sun visor according to claim 3, wherein the rotation regulating mechanism includes said sliding groove and a catch, said catch being provided at an opposite end of said sliding shaft of said auxiliary visor.

11. The vehicle sun visor according to claim 10, wherein when said catch engages said sliding groove, said auxiliary visor is prevented from rotating.

12. The vehicle sun visor according to claim 4, wherein the rotation regulating mechanism includes said sliding groove and a catch, said catch being provided at an opposite end of said sliding shaft of said auxiliary visor.

13. The vehicle sun visor according to claim 12, wherein when said catch engages said sliding groove, said auxiliary visor is prevented from rotating.

14. The vehicle sun visor according to claim 1,
   said visor main body having an upper flange and a lower flange,
   said sliding groove being formed on an inner surface of said upper flange,
   said support mechanism further comprising a second sliding groove,
   said second sliding groove being formed on an inner surface of said lower flange,
   said sliding shaft being provided on one end of said auxiliary visor so as to extend in a vertical direction, and
   said sliding shaft is supported between said sliding groove and said second sliding groove.

* * * * *